INVENTOR.
Donald F. Wilkes

INVENTOR.
Donald F. Wilkes

United States Patent Office

3,452,309
Patented June 24, 1969

3,452,309
ROLLER-BAND DEVICES
Donald F. Wilkes, Albuquerque, N. Mex., assignor to the United States of America as represented by the United States Atomic Energy Commission
Filed Nov. 15, 1967, Ser. No. 683,376
Int. Cl. H01h *3/32;* F16c *33/32*
U.S. Cl. 335—209                    16 Claims

ABSTRACT OF THE DISCLOSURE

A roller-band device which minimizes sliding friction, comprising rotatable members in a guideway with walls thereof spaced apart less than the summation of the diameters of the members for supporting the rotatable members, flexible band means between the guideway walls with a portion of the band means disposed between and partially encompassing said members to form a cluster and maintain the members generally parallel, and additional means attached or coupled to the cluster for urging said cluster along the guideway.

BACKGROUND OF INVENTION

This invention relates to roller-band devices of the type disclosed in copending U.S. application Ser. No. 643,314 by Donald F. Wilkes for Roller-Band Devices, filed May 29, 1967, wherein it is brought out that such devices may provide a wide range of mechanical and electromechanical functions with little or no friction losses. Various operations may be achieved with such devices using a relatively small number of readily assembled parts which are capable of modular construction and microminiturization with little or no degradation or compromising of operating characteristics and parameters.

There may be instances where it would be desirable to modify or improve the roller-band devices disclosed in application Ser. No. 643,314 to apply additional or different force biasing or longitudinal forces to the roller-band cluster.

SUMMARY OF INVENTION

It is therefore an object of this invention to apply new and improved force biasing to a roller-band device.

It is a further object of this invention to apply nonlinear force biasing to a roller-band device.

It is a further object of this invention to apply cyclically varying force biasing to a roller-band device.

Various other objects and advantages will appear from the following description of the invention, and the most novel features will be particularly pointed out hereinafter in connection with the appended claims.

The invention comprises a roller-band device having a plurality of rotatable members, a guideway having spaced apart walls for confining said rotatable members, said walls being spaced from each other a distance less than the summation of the diameters of said members, flexible band means intermediate said walls with a portion of said band means disposed between and partially encompassing said rotatable members for forming therewith a movable cluster and for urging said members toward parallel relationship, and additional means separate from said cluster for urging said cluster along said guideway.

DESCRIPTION OF DRAWINGS

Embodiments of the present invention are shown in the accompanying drawings wherein:

FIG. 2(*b*) is a force-deflection diagram for the device of FIG. 2(*a*);

FIG. 6(*b*) is a force-deflection diagram for the device of FIG. 6(*a*);

FIGS. 7(*b*) and 8(*b*) are force-deflection diagrams for the devices of FIGS. 7(*a*) and 8(*a*);

FIG. 9(*b*) is a force-deflection diagram for the device of FIG. 9(*a*); and

DETAILED DESCRIPTION

Figure 1:
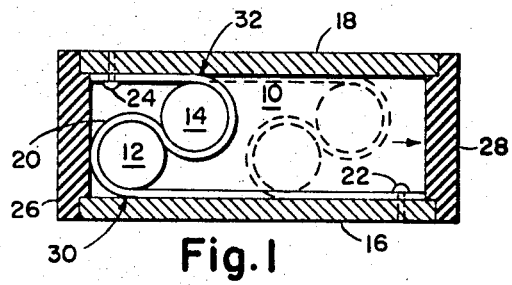
FIG. 1 is a side elevation view, partially in cross section of a roller-band device.

The mechanism shown in FIG. 1 illustrates various features of roller-band devices as described more fully in the aforementioned application. Roller-band device 10 includes a group or pair of adjacent rotatable members or rollers 12 and 14 supported between spaced surfaces or walls 16 and 18 of a guideway by a flexible tension band or ribbon 20 to form a stable or locked, free-rolling, roller-band cluster. (The band is illustrated with exaggerated thickness for purposes of illustration since in many applications the band may be less than .004 inch thick.) Band 20 extends in a generally S-shaped configuration partially around members 12 and 14 and may be held under tension by suitable fasteners 22 and 24, such as screws or bolts, which attach or fasten the band ends at opposite extremities and on opposing walls of the guideway. The guideway walls 16 and 18 may be supported at either end by suitable end blocks or walls 26 and 28 fastened thereto. In some applications it may be desirable to close the sides of the guideway to form a chamber or housing (not shown), in which cases, the guideway may be formed of generally square or rectangular tubing. The summation of the diameters of the rotatable members is at least slightly greater than the distance between walls 16 and 18 of the guideway so as to maintain a locked or stable, roller-band cluster. Rotatable members 12 and 14 are shown in an initial position adjacent end wall 26, with the band 20 shown departing from contact with walls 16 and 18 at contact "lines," zones or lines of tangency 30 and 32. Upon application of a suitable longitudinal force in the direction of the arrow, the roller-band cluster may rotate along the guideway walls to a second position as indicated by the dotted lines.

As the band 20 is looped or threaded around members 12 and 14 and fastened under tension by suitable means to diagonally opposite walls 16 and 18 of the guideway, the band tension urges the rotatable members firmly toward their respective restraining walls 16 and 18 and urges them generally parallel to each other, the combined effect of band and walls being to urge the rollers toward each other. With the rollers in the noted initial relationship, the position of the contact lines or zones may be varied to an extent by changing the tension of the band.

As brought out in the aforementioned copending application, desired force biases may be generated with roller-band device 10 by choosing one or more cutout or band cross section configurations or variations and combinations. There are some applications where it may be desirable to use a primary force biased or nonbiased tension band and rotatable member pair in conjunction with one or more secondary tension bands with or without their own rotatable members having separate force biasing to obtain a desired composite force biasing. The additional secondary tension bands may act as a pusher or damping on the primary tension band.

The tension band 20 may be made of a wide range of materials or combinations thereof depending on the particular application of the device.

In order to provide flexibility and shock resistance in the tension band itself so as to maintain the desired tension, ring or maze type cutouts or corrugations may be provided at the band ends or the band may be made of an elastic material.

Figure 11:
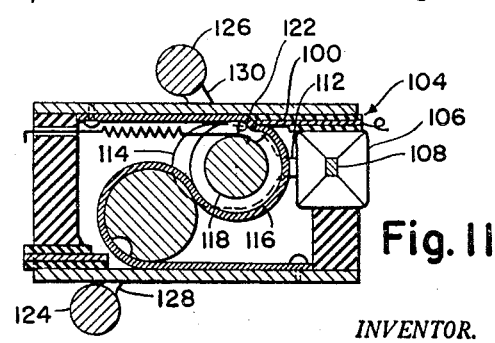

The rotatable members or rollers may be any suitable hollow or solid shape such as a cylinder or prism and variations thereof. The rollers may also be made with one or more spring biased members which may be urged outwardly against the side walls of the guideway to eliminate the need to precisely control roller lengths as is needed in some cases. Also, in some application desired force patterns detenting, latching, etc., may be obtained by using alternate or complex rotating member shapes. The rotatable members may also be formed in a spool shape as shown in FIG. 11.

The rotatable members may be made of a wide range of materials with or without coatings.

The guideways or housing supporting or restraining walls may be made of any suitable material depending on the application of the roller-band device such as conventional insulating materials and metals or alloys. Further, the guideway side walls may be provided with sears, wedges, electrical contacts, magnetic actuated pin latches, etc., depending on the particular application of the roller-band device.

While roller supporting walls are shown in the drawings as generally equidistantly spaced from each other as flat parallel members they may be flat arcuate members or of diverging or converging relationship with respect to each other, so long as the distance between them is at their effective operative portions not greater than the sum of the effective diameters of the rollers.

The end walls may also include various latching and detenting mechanisms as well as adjusting screws for positioning or releasing the tension band and rotatable members in or from a force bias. The end walls may be made of any suitable material depending on the application of the roller-band device and function performed by the end wall.

The following description and drawings illustrative various embodiments of this invention having force bias generating means or means for applying forces to some external device wherein the forces are applied to the roller-band cluster by a means separate from the cluster.

Figure 2A:
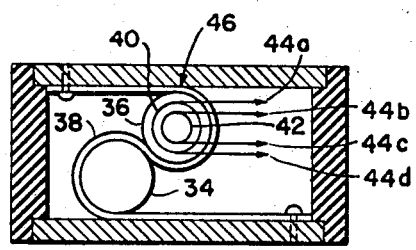
FIG. 2(*a*) is a side elevation view, partially in cross section, of a roller-band device modified in accordance with this invention which may provide a wide range of force levels.

FIG. 2(a) illustrates one form of a modified roller-band device which may generate or be subjected to various discrete, generally constant, force functions or levels other than by or through the roller-band cluster itself. In FIG. 2(a), rotatable members 34 and 36 may be supported or confined between suitable guideway walls or surfaces by a flexible tension band 38 fastened under tension thereto so as to form a stable or locked, free-rolling roller-band cluster. One or both of the rotatable members may include one or more pulley or shaft portions or varying diameters extending or protruding from one surface or end of the member, such as shafts 40 and 42. Suitable belt or drive couplings 44a, 44b, 44c and 44d may be attached to the shafts by any conventional fastener so as to extend from below or above the member's axis at any desired radius therefrom and connected to some utilization or force generating means (not shown). As the roller-band cluster travels along the guideway, the belts may either unwind from their respective shafts or become further coiled thereon depending on the direction the cluster is traveling and the position of the band with respect to the rotatable member's axis.

Figure 2B:
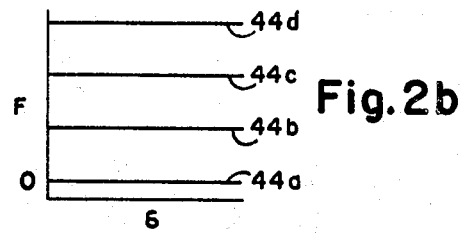

FIG. 2(b) illustrates the various force levels (F) vs. cluster displacement ($\delta$) which may be generated by their respective drive couplings parallel to the direction of cluster travel along the guideway. These force levels are dependent on moments generated around line contact 46 of band 38 and rotatable member 36 with the guideway.

These same drive couplings may be utilized to provide varying displacements of the utilization means as compared with cluster displacement as well as varying force levels. Drive couplings 44a and 44b may travel a shorter distance than the roller-band cluster while drive couplings 44c and 44d may travel a greater distance than the cluster. As the radius of the drive coupling increases, the differential displacement between coupling and cluster increases.

It will be apparent that a similar functioning or operation may be achieved by using a spool-shaped roller in place of member 36 in which the shafts or pulleys are central or internal portions of the roller having diameters different from the rotatable member. In order to connect the drive couplings to their associated means, the couplings may be directed in the opposite direction to that shown or a rectangular cutout may be provided in band 38 through which the couplings may pass. Pulleys or shafts may also be used having greater diameters than the rotatable members themselves to attain even different force levels. Further, various combinations of the belt attachments shown as well as combinations of attachments to rotatable member 34 may be used to obtain a wide range of resultant forces or operating parameters.

The force functions generated by a roller-band device through a drive coupling may be further modified as shown in FIGS. 3(a), 3(b), 3(c), 3(d), 4 and 5 by attaching a conventional elastic or spring biasing means such as a coil spring between the drive coupling and utilization means. (For purposes of this application, it will be assumed that all force functions are generated in the direction of the arrow in FIG. 3(a), except where indicated otherwise). A roller-band cluster such as shown in FIG. 2(a), including a pair of rotatable members 34 and 36 and a flexible, tension band 38, may be supported and restrained in the desired stable, locked configuration or geometry within suitable guideway restrains or supports, a shown. Drive couplings 48a, 48b, 48c and 48d may be coupled or attached to pulley or shaft portions 50a, 50b, 50c and 50c respectively which extend or protrude from one end of member 36 in the same manner as in FIG. 2(a). Drive coupling 48b, may be connected or fastened to shaft 50b so that the force function effectively acts upon member 36 at its axis by use of a suitable collar 54 mounted on a knife-edge type shaft 50b. A biasing means having a positive spring constant force function, such as coil springs 52a, 52b, 52c and 52d may be fastened or connected to the drive couplings and anchored to some suitable utilization means (not shown) or the end blocks themselves.

Figure 3A:
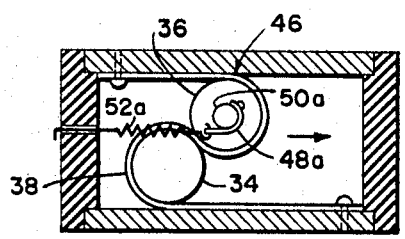
FIGS. 3(*a*), (*b*), (*c*) and (*d*) are side elevation views, partially in cross section, of roller-band devices which may be biased by linearly or nonlinearly varying forces.
Figure 3B:
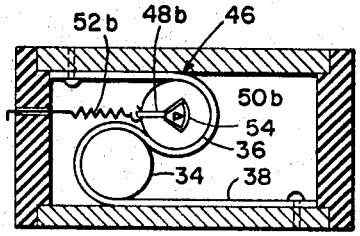
Figure 4:
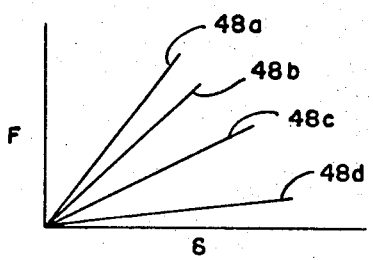
FIGS. 4 and 5 are force-deflection diagrams for the devices of FIGS. 3(*a*), (*b*), (*c*) and (*d*)

The force functions vs. cluster displacements generated by the above described drive couplings of FIGS. 3(a), 3(b), 3(c) and 3(d) may be linearly increasing forces parallel to the direction of cluster travel along the guideway as shown in FIG. 4. The slope of the force functions may be dependent on moments generated around line contact 46 of band 38 and rotatable member 36 with the guideway. Elastic decelerations and high forces may be achieved by providing some slack in the drive coupling at the initial position of the cluster.

Figure 3C:
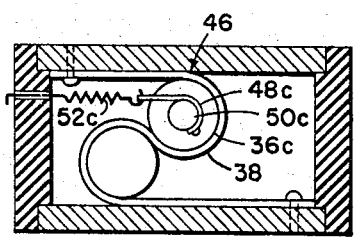
Figure 5:
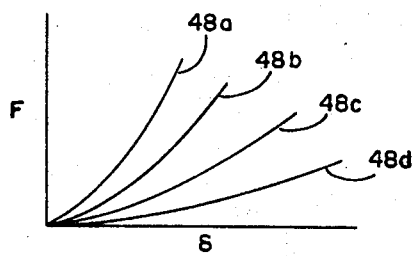
Figure 3D:
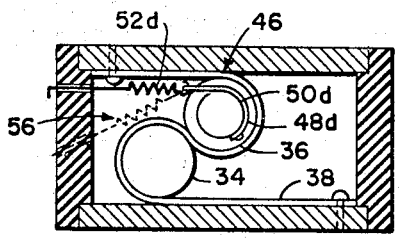

The drive couplings and springs may be skewed or fastened to the end block at some angle to the direction of cluster travel such as coupling 48d and spring 52d in FIG. 3(d) as shown at 56. If all the drive couplings and springs illustrated in FIGS. 3(a)–3(c) are also skewed in the same manner, nonlinear force functions may be generated as illustrated in FIG. 5.

Figure 8A:
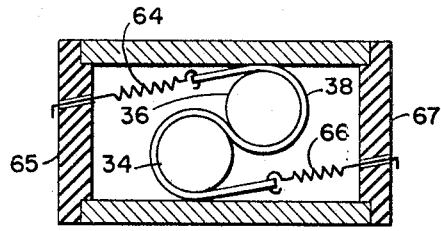
Figure 8B:
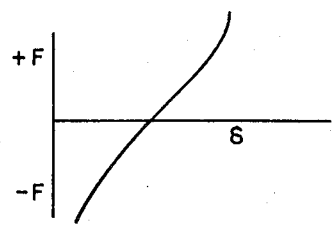

A force function may also be applied to the device in FIG. 3(a) wherein the force function includes both a positive and negative force portion crossing the axis at a position of zero force biasing (and thus a stable cluster position), by fastening spring 52a to some external support such that band 48a is directed through the guideway wall adjacent member 36 at an acute angle to a perpendicular to the cluster travel. Such a device may also generate a force function such as shown in FIG. 8(b) by adding band 48c and spring 52c of FIG. 3(c) and fastening spring 52c to some external support such that band 48c is directed across band 48a at an acute angle to the same perpendicular.

Figure 6A:
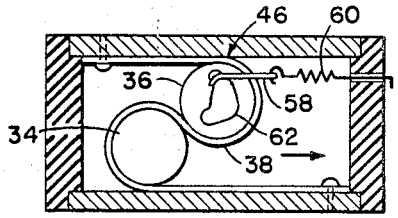
FIG. 6(*a*) is a side elevation view, partially in cross section, of a roller-band device which may be biased by a cyclically varying force.
Figure 6B:
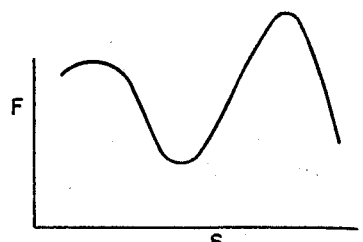

FIG. 6(a) illustrates a roller-band device having a drive coupling 58 and spring bias 60 fastened to a shaft or pulley 62 having varying radii or a noncircular cross section as member 36 rotates during cluster travel along the guideway. As member 36 rotates, the moment generated about line contact 46 varies with the radius as well as the angle or skewing of drive coupling 58. Thus, any desired force function may be achieved by proper selection of the shape of shaft 62. For the shape shown, a force function vs. cluster displacement as shown in FIG. 6(b) may be generated in the direction of the arrow in FIG. 6(a).

Figure 7A:
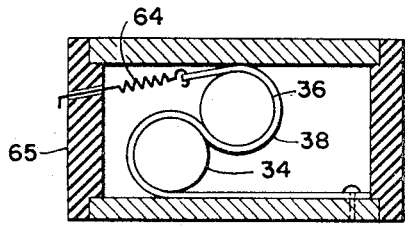
FIGS. 7(*a*) and 8(*a*) are side elevation views, partially in cross section, of roller-band devices which may be biased by nonlinear forces.
Figure 7B:
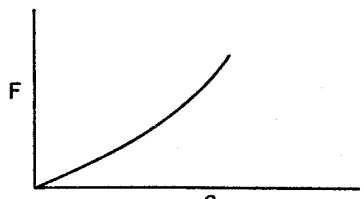

Generally, if the normal tension band of a roller-band device is fastened to the guideway walls by a spring or elastic biasing means such as a helical coil spring, additional compliance may be introduced into the roller-band cluster and possibly variations of the normal forces generated by the cluster. Such a configuration does not affect or add any force biases to the system. However, if the spring is fastened to the guideway or end blocks at some angle or skew to the direction of cluster travel, force biases may be introduced into the device. For instance, in FIG. 7(a), helical coil spring 64 may be fastened to the end of flexible tension band 38 of a roller-band cluster, including rotatable member 34 and 36, and in turn fastened to the end block 65, as shown. This configuration may generate a nonlinearly increasing force function or bias as indicated in FIG. 7(b). If the opposite end of band 38 is also fastened to a helical coil spring 66, such as shown in FIG. 8(a), which is in turn fastened to the guideway or opposite end block 67 at some angle to the direction of cluster travel, a force function or bias may be generated as indicated in FIG. 8(b). The force function shown in FIG. 8(b) may provide a stable, roller-band cluster position at the point where the force function crosses the zero force axis or position of zero force bias. The forces generated by the configurations shown in FIGS. 7(a) and 8(a) may be dependent on the angle of skew of the band end as well as the force generated by the spring.

Figure 9A:
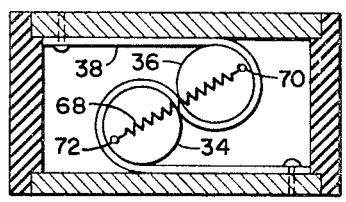
FIG. 9(*a*) is a side elevation view, partially in cross section, of a roller-band device which may be biased by a sinusoidal force.

Further force functions or force biases having cyclical or sinusoidal variations may be generated by fastening an elastic member or spring between any desired pins or positions on the end of the rotatable members in a roller-band cluster, such as the cluster formed by members 34 and 36 and flexible tension band 38 in FIG. 9(a). For instance, a spring 68 fastened or attached between pins 70 and 72 in the position shown may generate a sinusoidal force function of the type shown in FIG. 9(b) as the cluster travels along the guideway. The force function may be varied to any desired complex cyclical shape by the proper selection of pin position, both angularly and radially. Rotatable members may be made having a separate rotatable end portion attached to the main body of the member by a spring biased ratchet around the circumference of the member. The end portion may include a fixed pin mounted thereon which may be angularly rotated with the end portion to any desired position relative to its initial position to the member and cluster.

Similar force functions or biases may be generated by fixing one end of an elastic member or spring to a pin on the end of one rotatable member such as pin 72 on member 34 and attaching the other end of the elastic member to some fixed position on the guideway or external thereto.

Figure 9B:
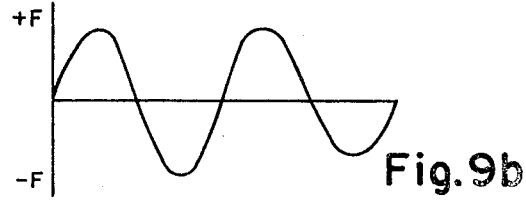

The negative portion 74 of the force function shown in FIG. 9(b) may be used so that the roller-band cluster may sense some external force applied to the device, such as an acceleration force, by positioning the cluster in the guideway at the desired point or force level to be sensed, for example at force level 76. Thus, should the roller-band cluster be subjected to a force in the direction of the arrow which is equal to or exceeds the force level 76, the cluster may break away and roll along the guideway in the direction of the applied force until it reaches the end of the guideway or a portion of the force function on the next cycle which exceeds the applied force. A toggle action or energy detenting may be achieved by positioning the cluster initially at position 78 of the force function to thus require a given amount of energy to be applied to the cluster before breakaway occurs.

Figure 10:
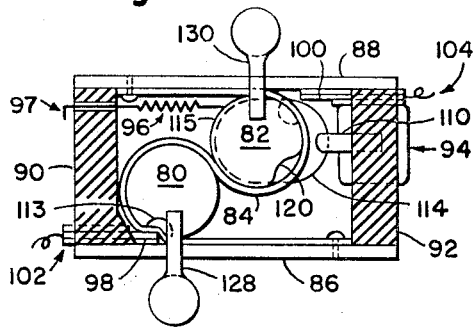
FIGS. 10 and 11 are side cross-sectional views of a force sensitive roller-band device made in accordance with this invention in which cross sections have been taken of different portions of the device.

The roller-band devices shown above and their respective force functions or biases may be used in a wide range of industrial and household applications by proper selection of the type force function and force levels desired and the corresponding roller-band cluster configuration. For instance, a force function of the type shown in FIG. 4 using the roller-band cluster configuration shown in either FIGS. 3(c) or 3(d) may be used in conjunction with a solenoid as a magnetic latching relay as will be described more fully with respect to FIGS. 10 and 11. FIG. 10 illustrates a magnetic latching relay in its initial open position by a side view cross section at the ends of the rotatable members while FIG. 11 illustrates the same relay in its final or energized position by a side view cross section at the center of the rotatable members.

The magnetic latching relay includes a pair of rotatable members 80 and 82 supported in a stable, roller-band cluster by a flexible band 84 fastened under tension between guideway surfaces or walls 86 and 88 and end blocks 90 and 92. A flux generator or solenoid 94 may be suitably mounted in end block 92 so as to apply an energizing force to the roller-band cluster while a helical coil spring and band means 96 may be mounted by holder 97 in end block 90 and attached to member 82 to provide the necessary return force to the cluster. Electrical contacts 98 and 100, suitably insulated from the end blocks and guideways, may be positioned on guideway surfaces 86 and 88 at diagonally opposing ends thereof so as to sense the position of the roller-band cluster in either its energized or deenergized position. Contacts 98 and 100 may be a single electrical contact as shown or a bank of contacts which may form an electrical circuit through band 84 to any convenient point or position on the guideways or end blocks. Where there is a bank of contacts, band 84 may include a plurality of insulated conductors embedded therein which may be bared at the points of contact and electrical contact made with the band conductors to complete the circuit. In either case suitable electrical connections may be made to some utilization device or circuit to contacts 98 and 100 at points 102 and 104 and to the guideways, end blocks or band.

Solenoid 94 may include a coil 106 wound around a base portion 108 of a generally U-shaped magnetic yoke or core. Coil 106 may be energized by any conventional direct current power supply and switch circuit (not shown). The yoke includes, besides base portion 108, a first leg 110 at one end of the coil adjacent one end of member 82 and a second leg 112 at the other end of the coil. Leg 112 may include an enlarged, generally oval-shaped portion 114 which may be adjacent rotatable member 82 in both the energized and deenergized positions of the relay.

Rotatable member 80 may be any generally cylindrical shape of any convenient electrically conducting or non-conducting material having a groove or removed portion 113 positioned adjacent contact 98 in the cluster's initial position shown in FIG. 10. Rotatable member 82 may be spool shaped with a first outer or flange portion 115 and a second outer or flange portion 116 separated by a central portion of reduced diameter 118, to which coil 96 may be attached as shown in FIG. 11. Member 82 may be made of any suitable magnetic material such as soft iron. Flange portion 115 may include a sinusoidal-like groove or indentation 120 disposed adjacent leg portion 110 of the solenoid yoke so that as the roller-band cluster and member 82 rotates along the guideway, the gap between leg 110 and flange portion 115 (also groove 120) may decrease linearly, but at a slower rate than the total movement of the cluster in the guideway. The rate of decrease may be adjusted by varying the shape of groove 120 and thus effectively extend the amount or length of cluster displacement while maintaining a small initial gap between leg 110 and flange 115. Flange portion 116, may include, similar to groove 113 of member 80, a groove or removed portion 122 which may be positioned adjacent contact 100 in the cluster's final or energized position indicated in FIG. 11. Grooves 113 and 122 may provide enhanced electrical contact pressure between the contacts and band as well as a cleaning or wiping action on the surface of the band and contacts.

With solenoid 94 deenergized, coil means 96 tends to urge the roller-band cluster towards end block 90 in the position shown in FIG. 10 with band 84 in electrical contact with contact 98. When coil 106 is energized, a magnetic flux may be produced in the magnetic circuit formed by the solenoid yoke through leg 110, flange 115, central portion 118, flange 116, and leg 112 (including enlarged portion 114) which may pull or urge the cluster longitudinally along the guideway, opposing coil means 96. Assuming that the flux is sufficiently strong to offset the coil means force bias, the cluster may roll along the guideway and make contact with electrical contact 100 and close some electrical circuit. When coil 106 is de-energized, the cluster may return to its initial position under the force bias generated by coil means 96.

The magnetic latching relay shown in FIGS. 10 and 11, or any other roller-band device, may be modified so as to be insensitive to any acceleration forces, shocks or vibrations which it may be subjected to. Such a modification may be especially desirable if it is desired to maintain the length of travel and electrical contact gaps very small. Such insensitivity may be achieved by mounting counterweights or counterbalances 124 and 126 on members 80 and 82 respectively by arms 128 and 130. Arms 128 and 130 may be fixedly attached to both ends of the members so that the counterbalances are maintained in the positions shown in FIG. 10 until the device is energized by the solenoid.

While for purposes of illustration various features are shown in different views, it will be clear that various features may be combined and embodied into a single device. It will also be understood that various changes in the details, materials and arrangements of the parts, which have been herein described and illustrated in order to explain the nature of the invention, may be made by those skilled in the art within the principles and scope of the invention as expressed in the appended claims.

What is claimed is:

1. A device of the class described, comprising a plurality of rotatable members, a guideway having spaced apart walls supporting, guiding and restraining said rotatable members, said walls being spaced from each other a distance less than the summation of the diameters of said rotatable members, flexible band means supported under tension between said walls, said band means having a portion disposed between and partially encompassing adjacent rotatable members in a generally S-shaped fashion for forming therewith a movable cluster and providing rolling motion between said members and said band means and between said members and said walls and for maintaining said members with axes parallel, said adjacent rotatable members turning in opposite directions, and additional means coupled to said cluster for urging said cluster along said guideway.

2. The device of claim 1 wherein said members are provided with end portions of diameters different than centrally disposed portions.

3. The device of claim 2 wherein said band means partially encompasses one of said portions of said members.

4. The device of claim 3 wherein said additional means is coupled to the other of said portions of said members.

5. The device of claim 4 wherein said additional means includes an elastic member.

6. The device of claim 4 wherein said additional means is disposed generally parallel to the direction of cluster movement along the guideway.

7. The device of claim 4 wherein said additional means is angularly disposed to direction of cluster movement along the guideway.

8. The device of claim 4 wherein the portion of said member to which said additional means is coupled includes a portion of noncircular cross section.

9. The device of claim 8 wherein one of said members is magnetizable and the additional means includes a solenoid magnetically coupled to said magnetizable member and separated from said noncircular portion by a magnetic flux gap.

10. The device of claim 1 wherein said additional means includes an elastic member attached to said band means.

11. The device of claim 10 wherein said elastic member is angularly disposed to direction of cluster movement along the guideway.

12. The device of claim 11 wherein said additional means includes a second elastic member attached to said band means.

13. The device of claim 1 wherein said additional means includes an elastic member attached to a portion of a rotatable member.

14. The device of claim 13 wherein said additional means includes an elastic member attached between end portions of rotatable members.

15. The device as claimed in claim 1 wherein there is provided an electrical contact adapted to be actuated in response to movement of the rollers.

16. The device of claim 1 including counterbalance means attached to each of said rotatable members.

References Cited

UNITED STATES PATENTS

| | | | |
|---|---|---|---|
| Re. 15,345 | 4/1922 | Robson | 308—217 X |
| 173,215 | 2/1876 | Doremus | 103—149 |
| 2,033,141 | 3/1936 | Kraut | 308—5 X |
| 2,733,069 | 1/1956 | Frost. | |
| 2,959,057 | 11/1960 | Winker | 73—516 |
| 3,167,962 | 2/1965 | Scotto | 73—515 X |
| 3,251,627 | 5/1966 | Fisher | 242—107 |
| 3,344,675 | 10/1967 | Hellen | 73—517 |
| 3,396,328 | 8/1968 | Yuan | 73—517 X |

FOREIGN PATENTS 542,961  1/1932  Germany.

MARTIN P. SCHWADRON, *Primary Examiner.*

L. L. JOHNSON, *Assistant Examiner.*

U.S. Cl. X.R.

200—52, 153; 308—6, 202, 209; 335—1, 171, 190, 203, 228, 272